KEY CUTTING MACHINE AND METHOD

Original Filed Nov. 3, 1961 3 Sheets-Sheet 1

Inventor
HARRY SIMON

By Soans, Anderson, Luedeka & Fitch
Attys

KEY CUTTING MACHINE AND METHOD

Original Filed Nov. 3, 1961 3 Sheets-Sheet 2

Inventor
HARRY SIMON

By Soans, Anderson, Luedeka & Fitch
Attys

KEY CUTTING MACHINE AND METHOD

Original Filed Nov. 3, 1961 3 Sheets-Sheet 3

Inventor
HARRY SIMON

By Soans, Anderson, Luedeka & Fitch
Attys

United States Patent Office

Re. 26,848
Reissued Apr. 7, 1970

26,848

KEY CUTTING MACHINE AND METHOD

Harry Simon, 9229 S. Bennett, Chicago, Ill. 60617

Original No. 3,118,346, dated Jan. 21, 1964, Ser. No. 149,985, Nov. 3, 1961. Application for reissue July 1, 1968, Ser. No. 746,215
Int. Cl. B23c *1/16, 1/18;* B21k *13/00*
U.S. Cl. 90—13.05 10 Claims

Matter enclosed in heavy brackets [ ] appears in the original patent but forms no part of this reissue specification; matter printed in italics indicates the additions made by reissue.

ABSTRACT OF THE DISCLOSURE

*A key cutting machine and method for providing and preparing a key from a lock cylinder by inserting into the lock cylinder a blank key and providing cuts on a second blank key having a location and depth corresponding to the location of each cylinder pin and its increment of protrusion from the cylinder.*

The present invention relates to a key cutting machine, and more particularly to a key producing machine which permits high accuracy in a minimum of time and does not require an original of the key.

Key cutters which are duplicating machines are well known to the art, but they require an original of the key. Working from the lock cylinder in a minimum of time and with a minimum of technical skill creates a number of problems. To understand these problems, the operation of a key lock should be clearly in mind. Key locks comprise generally a housing having a horizontally extending cavity in which is rotatably received a cylinder or barrel. There are a row of holes in the cylinder which align with a row of holes in the housing when the cylinder is rotated into a certain position. There are a pair of pins for each aligned pair of holes. These pins may be referred to respectively as housing pins or drivers and as cylinder pins. Each housing pin is spring loaded toward the cylinder so that, when the holes are aligned, the housing pins urge the cylinder pins into the respective aligned holes in the cylinder. The cylinder pins are shorter than the cylinder holes, so that the housing pins extend into the cylinder holes and prevent the cylinder from rotating from the aligned position. The lock is thus "locked." The key, with its grooves of various depths, is inserted into a broached slot in the cylinder, which slot is aligned with the holes. The key serves to raise each pair of cylinder pins to the height positioning the meeting line between the pair of cylinder and housing pins at the meeting line between the lock cylinder and the housing. In this condition, the cylinder can be turned. The cylinder is provided with means for actuating the latch when the cylinder is thus rotated, the lock thereby being "opened." It may be seen that having the proper depth and location grooves in the key is very important to the proper operation of the lock. If the key groove is too deep, a housing pin will extend down into a cylinder hole, preventing the cylinder from rotating, while if the key groove is too shallow, a cylinder pin will extend up into a housing hole, also preventing the cylinder from rotating. In either case, failure of the key to work the lock or at least sticking will result. To measure each cylinder pin and make a cut in the key of that depth is obviously time consuming, and inaccuracies may be interjected during the transfer of such information. To rely upon the lock manufacturer's specifications is impractical for several reasons. There are so many manufacturers, making so many different locks, that trying to maintain accurate records is not feasible. In addition, the dimensions of pins change through wear. Also, the dimensions of pins and cylinders are changed by filing or grinding which is often done when a new key is made for the lock.

The machines of the prior art have generally either been complicated and time consuming, requiring a number of adjustments, or they have introduced inaccuracies by attempting to employ various short-cuts. Some prior machines and method have utilized manufacturer's specifications. Others have introduced inaccuracies by measuring from pins which are dropped into cylinder holes without regard for the fact that variations in the depth of the cylinder holes, either from the original broaching or due to wear, often occur.

Accordingly, the principal object of the present invention is to provide an improved key cutting machine for rapidly and accurately producing a key for a lock. It is a further object to provide such a machine and method which utilizes the actual length of the lock cylinder pins so as to provide essentially exact displacement of the pins for operating the lock. Other objects and advantages of the invention will become apparent from the following description and accompanying drawings, wherein.

The illustrated cutting machine directly translates the actual dimension of a cylinder pin into a cut of the proper depth in a key blank. Specifically, by inserting a first key blank into the lock to be fitted, the cylinder pins of that lock are made to protrude from the cylinder surface. By thus supporting all of the pins on the edge of the key blank, any wear or size variation of the pins is compensated for fully. By cutting into another key blank the amount of the protrusion of a pin, a groove is produced which will elevate that pin (when the cut blank is inserted into the lock) to the level of the outer surface of the cylinder. When a cut is made for each of the pins, the cut blank will so raise all of the pins, and an extremely accurate key has been provided for the lock. The illustrated machine will rapidly cut all these grooves, after a single initial setting, by merely indexing the mechanism and pulling an actuating lever.

Figure 1:
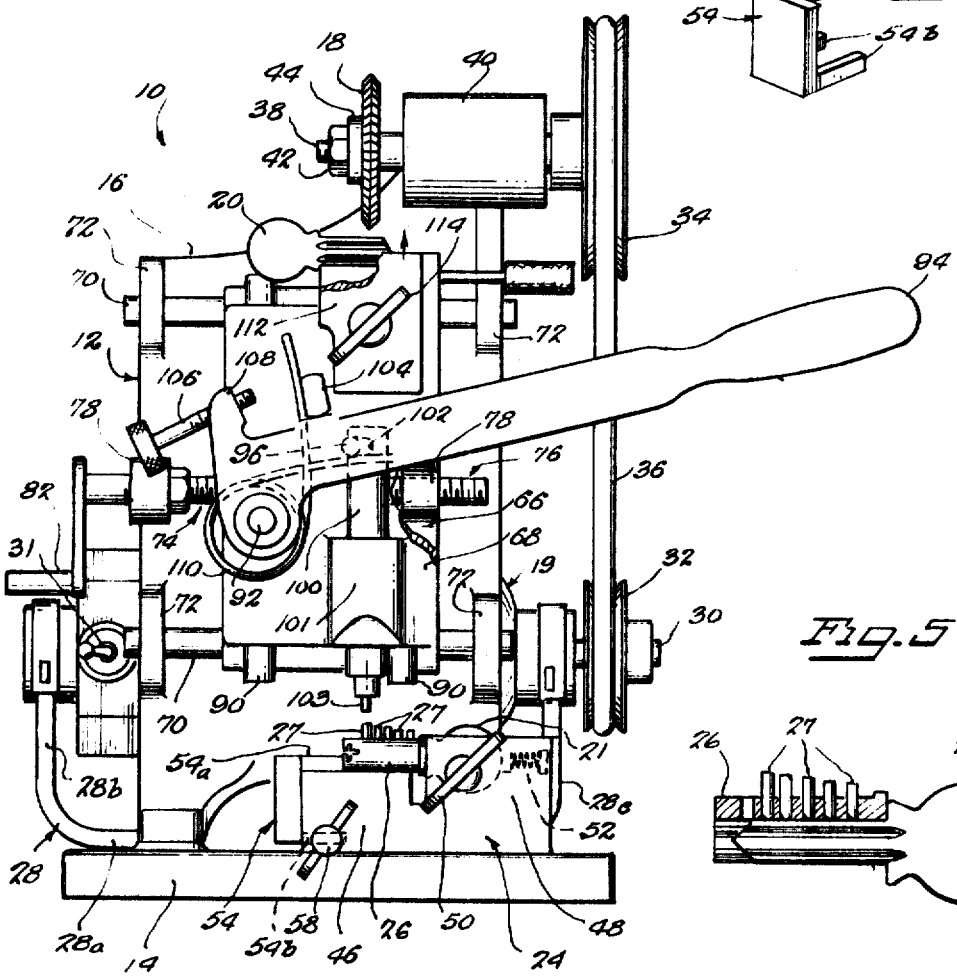
FIGURE 1 is a front view, with parts broken away, of a key cutting machine embodying various features of the present invention.
Figure 2:
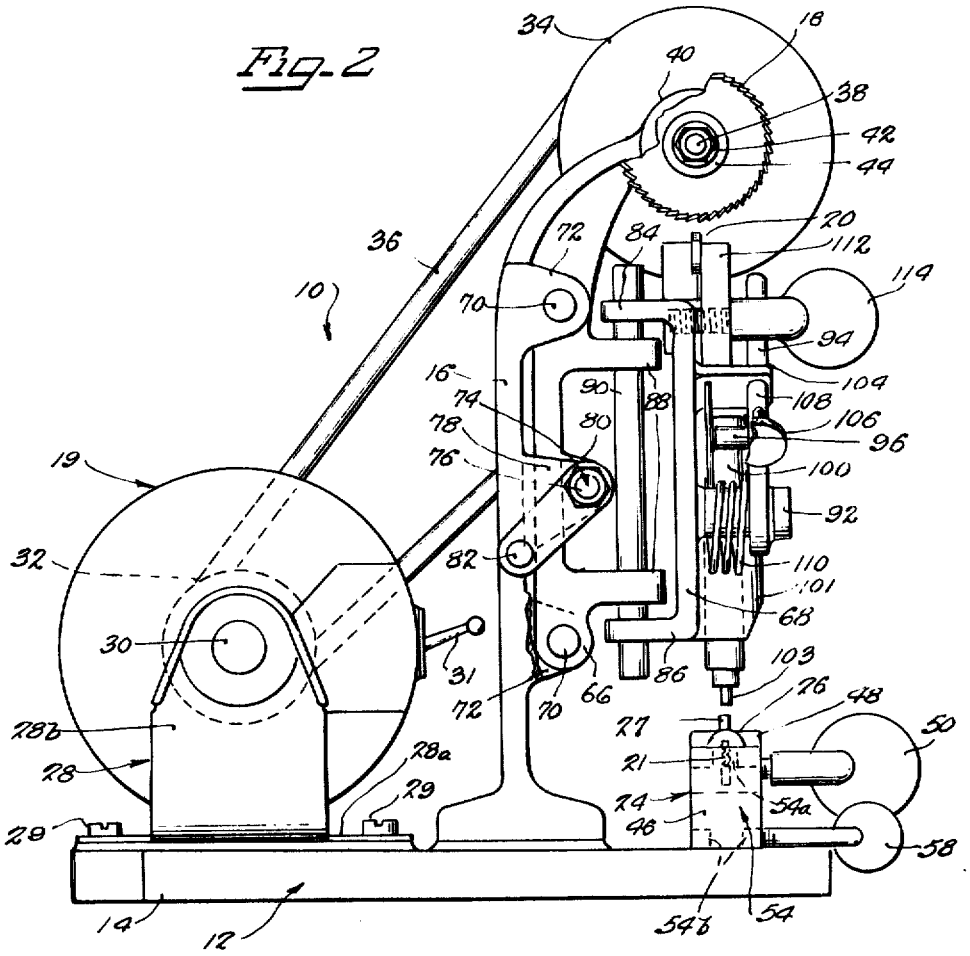
FIGURE 2 is a side view, with parts broken away, of the machine shown in FIG. 1.

The key cutting machine 10 seen best in FIGS. 1 and 2 comprises, generally, a frame 12 which support a rotatable cutting wheel 18 and a motor 19 for driving the wheel. Also supported upon the frame 12 is a mechanism for holding the key blank 20 to be cut, for indexing the blank 20 and for moving it against the cutting wheel 18. Also mounted on the frame 12 is a holder 24 for holding the lock cylinder 26 and the key blank 21 which is inserted in the cylinder to make the pins 27 protrude.

More specifically, the frame 12 of the illustrated cutting machine 10, which may be a single casting, includes a generally rectangular plate or platform section 14 which is adapted to lie upon a supporting surface such as a table or bench (not shown), and an upright section 16 which extends transversely of the platform section 14 intermediate the front and rear edges thereof. As seen best in FIG. 2, the motor 19 is mounted on the platform section 14 rearwardly of the upright section 16, while the holder 24 is mounted on the platform section 14 forwardly of the upright section 16. The motor 19 is supported with its axis extending generally horizontally and transversely of the machine. The motor 19 is supported in an upwardly facing, U-shaped motor bracket 28 which has its web portion 28a fixed to the platform section 14, as by means of bolts 29, and its legs 28b and 28c extending upwardly to support the motor 19 at either end thereof. The motor 19 includes an on-off switch 31 and a motor shaft 30 which extends outwardly beyond leg 28c and has fixed adjacent its end a driving pulley 32.

Disposed above the driving pulley 32 and forwardly therefrom is a driven pulley 34 which is driven by pulley 32 through an endless belt 36 which passes around the two pulleys. The driven pulley 34 is fixed to one end of a shaft 38 that is rotatably supported in a bearing 40 mounted atop the upright section 16 of the frame 12. The shaft 38 is disposed generally horizontally and transversely of the machine, lying generally parallel to the motor shaft 30. At the other end of the shaft 38 the cutting wheel or cutter 18 is fixedly mounted. As seen best in FIG. 1, the cutting wheel 18 may be removed for replacement or sharpening by removing a nut 42 and washer 44 which hold the cutting wheel 18 in place on the end of the shaft 38.

Figure 6:
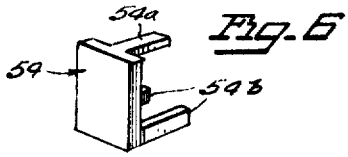
FIGURE 6 is an enlarged perspective view of the holding member for the lock cylinder.
Figure 5:
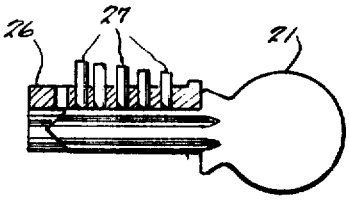
FIGURE 5 is an enlarged sectional view of a lock cylinder having a blank key inserted therein to cause the cylinder pins to protrude outwardly from the cylinder.

The lock cylinder 26, as noted above, is supported in position by the holder or support 24 with a key blank 21 inserted into it to cause the cylinder pins 27 to protrude upwardly from the cylinder (FIG. 5). The holder 24 includes a support or table portion 46 upon which the cylinder 26 rests, and a vice portion 48 which holds the key blank 21 in position. The vice portion 48 is tightened about the handle of the key blank 21 by a suitable thumbscrew 50. A spring mechanism 52 in the vice portion 48 (FIG. 1) serves to maintain the blank 21 fully inserted into the cylinder 26 while the thumbscrew 50 is being tightened. The cylinder 26 is further held in place by a locking member 54 which, as shown in FIG. 1, claps the lock cylinder 26 against the vice portion 48. The locking member 54, shown in detail in FIG. 6, is generally U-shaped and oriented on its side with its upper leg 54a abutting the end of the cylinder 26, and its lower leg 54b, which is bifurcated, being slidably received in a pair of mating slots in the holder 24. The holder 24 may be provided with a suitable thumbscrew 58 to engage the bifurcated arm 54b to maintain the locking member 54 in holding position.

The mechanism for holding and moving the key blank 20 which is to be cut, includes a transversely movable carriage or member 66 that is supported on the upright section 16, and a cross directional or vertically movable carriage 68 which is supported upon the transversely movable member 66.

The indexing or proper locating of the key blank 20 for each cut is controlled by the transverse movement of the indexing carriage 66. This carriage 66, as seen best in FIG. 2, is a vertically disposed, generally rectangular plate, supporting for transverse sliding movement upon a pair of horizontally extending, vertically spaced-apart guide rods 70. The guide rods 70 extend transversely of the machine, generally paralleling the axis of the cutter wheel 18. One rod 70 is received in a slot in the carriage 66 paralleling and adjacent to its upper edge, while the other rod 70 is received in a slot paralleling and adjacent to its lower edge. The rods 70 are each supported adjacent their ends by a pair of forwardly extending tabs 72 on the upright section 16.

Transverse movement of the carriage 66 is provided by means of a crank operated mechanism 74. The mechanism 74 includes a threaded rod 76 which extends generally parallel to the rods 70 and is rotatably supported in a longitudinally fixed position in a pair of brackets 78 on the upright section 16. The threaded rod 76 is threaded through a mating bushing or collar 80 (FIG. 2) fixed to the carriage 66. The end of the rod 76 away from the endless belt 36 is provided with a crank handle 82 which may be rotated by the user of the machine 10 to rotate the rod 76. The carriage 66 is thereby caused to move transversely of the machine 10, sliding upon its supporting rods 70.

The vertically movable carriage 68 is supported on the transversely movable carriage 66, as best seen in FIG. 2. The transversely movable carriage 66 is provided with a pair of forwardly extending, horizontally disposed extensions 88 which support a pair of transversely spaced, vertically extending support rods 90. The vertically movable carriage 68 is a generally vertically disposed plate having a pair of horizontal and rearwardly extending flange portions, namely, an upper flange portion 84 and a lower flange portion 86. The carriage 68 is disposed with the flange portions 84 and 86 disposed respectively above the upper and below the lower extensions 88 of the carriage 66. The guide rods 90 pass through suitable apertures in the upper and lower flange sections 84 and 86 to thereby position and provide guidance for the carriage 68. The carriage 68 is supported, when not in use, by the engagement of its upper flange section 84 upon the upper extension 88.

The illustrated machine 10 is provided with an elongated pivot or actuating handle or lever 94 for raising the vertically movable carriage 68. As seen in FIG. 1, one end of the lever 94 is pivotally mounted on the forward surface of the carriage 68, as by means of a pivot stud or pin 92. At a point spaced a short distance from its pivoted end, the lever 94 is provided with a rearwardly extending connection pin 96. The connection pin 96 serves to connect the lever 94 with a vertically disposed, elongated cylindrical plunger 100. The plunger 100 is slidably received in a vertically extending, circular opening provided by a guide or support block 101 fixed to the forward surface of the carriage 68. The connection pin 96 is slidably and rotatably received in a partial transverse slot 102 in the upper end of the plunger 100. The lower end of the plnnger 100 has a reduced diameter to provide a positioning contact or indexing pin 103. Thus, the support block 101 locates and provides lateral support for the plunger 100, while the pin connection 96 provides vertical support for the plunger.

A stop block 104, which is fixed on the forward surface of the carriage 68, is positioned to engage a stop pin 106 carried by an extension 108 of the pivoted end of the lever 94 to limit the clockwise rotation of said lever 94.

A spring 110 serves to urge the lever 94 in the upward or counterclockwise direction. The spring 110 is coiled about the pivot pin or stud 92 with one end abutting the stop block 104 and the other end abutting the pin 96 of the lever 94. The spring 110, by its action, thus also serves to maintain the plunger 100, which is supported on pin 96, in the raised position.

The functioning of the lever 94 and the vertically movable carriage 68 may now be readily understood. Downward pressure on the free end of the lever 94 causes it to rotate about pivot pin 92 in a clockwise direction and against the force of spring 110. This rotation of the lever 94 continues until the plunger 100, which is being moved downwardly due to the connection of the pin 96 with the slot 101, bottoms and cannot move downwardly any further. Further downward movement of the free end of the lever 94 now causes pivoting of the lever 94 about the pin 96 (as well as some relative transverse movement of the pin 96 in the slot 101). As the lever 94 thus pivots about the pin 96, its end which is fixedly pivoted to the vertically movable carriage 68, goes upwardly and raises the carriage 68. The amount of raising is controlled by the amount of rotation of the lever 94 permitted by the stop pin 106. The level to which the carriage 68 is raised is also controlled by the level at which the plunger 100 is bottomed or supported.

The key blank 20 which is to be cut is mounted in a vice 112 which holds the blank 20 in a position below the cutter 18 and extending transversely of the machine 10. The illustrated vice 112 is provided with a suitable thumbscrew 114. The parts of the machine 10 are so constructed that when the contact pin 103 at the lower end of the plunger 100 is aligned with one of the protruding cylinder pins 27, the key blank 20 is in position relative to the cutter 18 so that upward movement of the key blank 20 into the cutter will produce the proper cut or groove in the blank. That is, a cut will be produced at the proper location to receive the pin 27 when the key blank 20 is inserted into the lock cylinder 26.

Figure 3:
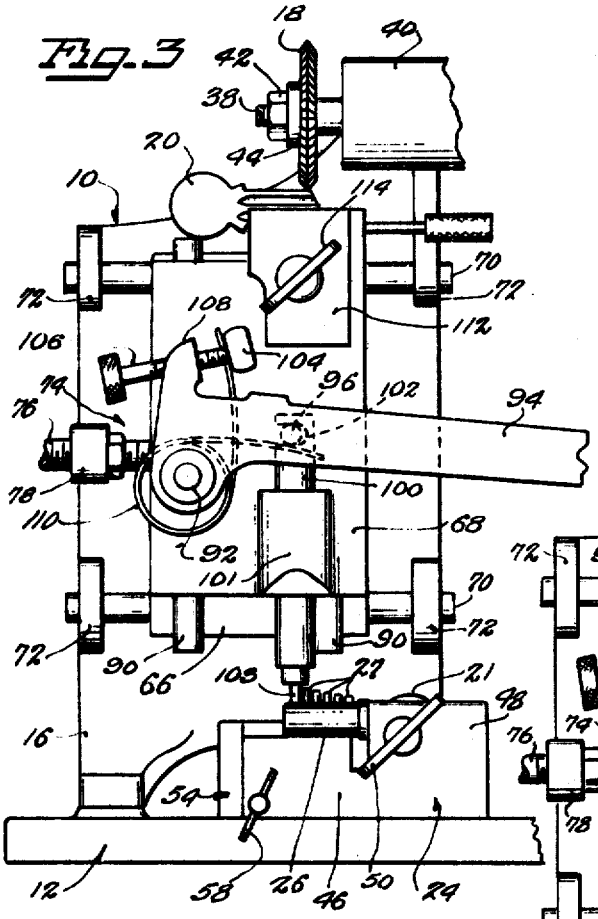
FIGURE 3 is a partial outlined front view, in decreased size, showing the position of the parts incident to the initial setting of the machine.
Figure 4:
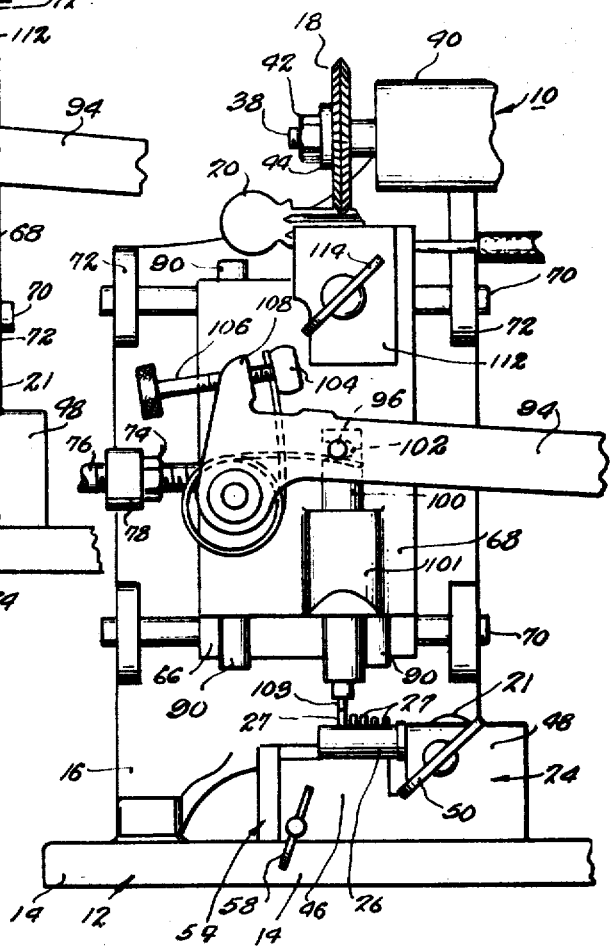
FIGURE 4 is a view similar to FIG. 3 showing the position of the parts incident to a groove being cut in the key blank.

Briefly, the machine 10 is initially set so that full rotation of the lever 94 just brings the blank 20 up to the cutter 18 (FIG. 3). Then by causing the plunger 100 to bottom at a higher position (higher by the amount of protrusion of a cylinder pin 27), the full rotation of the lever 94 will move the blank 20 into the cutter 18 by the amount of the protrusion (FIG. 4).

Specifically, to make the single initial setting, which will normally suffice for all of the cuts in the key blank 20, the transversely movable carriage 66 is positioned, as shown in FIG. 3, so that the indexing pin 103 will contact the upper surface of the cylinder 26 when the lever 94 is pulled. The setting pin 106 should be positioned to contact the stop 104 just as the upward movement of the carriage 68 and the key blank 20 into the cutter 18 by 20 to a position immediately below the cutting wheel 18, as shown in FIG. 3. In actual operation, the adjustment of the setting pin 106 may be made until the first contact is noted between the cutting wheel 18 and the key blank 20.

Now, once the initial adjustment has been made, the various grooves in the key blank 20 may be cut by merely moving the carriage 66 transversely so as to align the plunger 100 successively with the upwardly extending pins 27 of the lock, and pulling the lever 94 for each cut. More particularly, the crank handle 82 is turned until the pin 103 at the lower end of the plunger 100 is aligned with one of the protruding pins 27, as shown in FIG. 4. Then the lever 94 is pulled, as shown in that figure, raising the carriage 68 carries the upper edge of the key blank the increment by which the pin 27 protrudes. Next, the crank handle 82 is rotated to position the pin 103 above the next cylinder pin 27, and the lever 94 is again pulled. The operation is repeated until a groove is cut in the key blank 20 for each of the cylinder pins 27. In this manner, a key has been cut which will very accurately fit the lock, i.e., the insertion of the cut key blank 20 will serve to raise the cylinder pins 27 so that the upper end of each is approximately flush with the surface of the lock cylinder 26.

A highly accurate machine, which requires only a single initial adjustment, is thus provided. The initial adjustment itself does not depend upon manufacturers' specifications, but is derived directly from the physical structure of the lock. In particular, the manner of taking the groove-depth information from the lock (supporting them all upon a key blank inserted into the lock cylinder) insures the production of an accurate key regardless of variations in the depth of the cylinder pin holes.

Various changes and modifications may be made in the structure of the machine described above without departing from the spirit and scope of the invention as set forth in the following claims.

What is claimed is:

1. A machine for translating the increment of protrusion of a lock cylinder pin from its cylinder, when a key blank is inserted in the cylinder, into movement of a second key blank into a cutter, which machine comprises A. transfer mechanism including a carriage disposed between the cutter and the lock cylinder and movable therebetween in a first direction, (1) said carriage also being movable in a second direction transversely of said first direction, B. holder on said carriage for holding the second key blank which is to be cut adjacent to the cutter, C. an elongated member mounted on said carriage for movement in said first direction relative to said carriage.

(1) a first end of said member being disposed adjacent the lock cylinder,

D. an elongated lever pivotally connected at a first pivot point which is intermediate its ends to the second end of said elongated member, (1) said lever being pivotally connected to said carriage at a second pivot point which is spaced from said first pivot point, (2) rotation of said lever about said second pivot point so as to move said member toward the lock cylinder, serving, when continued after said member engages the cylinder, to move said carriage toward the cutter, E. adjustable stop means for limiting rotation of said lever to position the second key blank closely adjacent the cutter when said lever is pulled after said elongated member has engaged the cylinder surface, whereby when said carriage is moved in said second direction so as to position one of the lock cylinder pins adjacent said first end of said member, and said lever is pulled to engage said first end with the adjacent cylinder pin, said stop means will permit said lever to rotate far enough to move the second key blank into said cutter an amount equal to the protrusion of that contacted cylinder pin.

2. A key cutting machine for producing a key for a given lock cylinder, said machine comprising A. a frame adapted to rest upon a supporting surface, B. means on said frame adapted to support the lock cylinder and a key blank inserted into the lock cylinder so as to cause the pins of the cylinder to protrude past the outer surface of the lock cylinder, C. a carriage mounted on said frame for movement relative thereto, D. a second key blank mounted on one of said frame and carriage, E. a cutting disk rotatably mounted on the other of said frame and carriage, F. means for causing rotation of said cutting disk, G. means for causing movement of said carriage such as will bring said cutting disk and the second key blank into [proximity to] *engagement with* one another at selected points along the length of the second key blank, which points correspond to points on the first key blank at which said pins of said lock cylinder engage the first key blank, whereby said cutting disk will cause a cut in said second key blank for each corresponding pin of said lock cylinder, each of said cuts being thereby adapted to receive the corresponding pin of the said lock cylinder when said second key blank is inserted in said lock cylinders, (1) *said means for causing movement of said carriage including a lever mounted for pivotal movement, an indexing pin movably mounted adjacent said lock cylinder so as to enable it to be brought into and out of engagement with the upper end surfaces of the pins of said lock cylinder, means connecting said lever and said indexing pin so as to cause said indexing pin to be moved into engagement with the pins of said lock cylinder incident to pivotal movement of said lever in a given direction and for translating further movement of said lever in said given direction into movement effective to cause interengagement between said second key blank and said cutter,*

H. and means for limiting movement of said carriage so as to limit the depth of each of the cuts in said second key blank to a distance equal to the increment which the corresponding pin of the lock cylinder protrudes past the upper surface of the said lock cylinder.

3. A key cutting machine for producing a key for a given lock cylinder, said machine comprising A. a frame adapted to rest upon a supporting surface, B. means on said frame adapted to support the lock cylinder and a key blank inserted into the lock cylinder so as to cause the pins of the cylinder to protrude *generally vertically upwardly from the lock cylinder* past the outer surface *thereof, the pins being thereby gravity biased inwardly of the cylinder,* [of the lock cylinder,]

C. a carriage mounted on said frame for movement relative thereto,

D. a second key blank mounted on one of said frame and carriage,

E. a cutting disk rotatably mounted on the other of said frame and carriage,

F. means for causing rotation of said cutting disk,

G. indexing means fixed to said carriage selectively engageable with the outer surface of said lock cylinder so as to provide a reference, and selectively alignable and engageable [with] with each of the pins protruding from said lock cylinder when said carriage is moved relative to said cylinder, H. means for causing relative movement between said [carriage] *cutting disk* and the second key blank so as to bring the second key blank and said cutting disk into immediate proximity to each other when said indexing means is in engagement with the outer surface of said lock cylinder *while maintaining the lock cylinder in a disposition in which the pins of the cylinder are generally vertically disposed,*

I. and means for causing additional relative movement between said [carriage] *cutting disk* and the second key blank when said indexing means is in alignment and engagement with one of said pins so as to cause said cutting disk to provide a cut in the second key blank equal in depth to the increment of protrusion of said pin from said lock cylinder.

4. A key cutting machine for producing a key for a given lock cylinder, said machine comprising A. a frame adapted to rest upon a supporting surface, B. means on said frame adapted to support the lock cylinder and a key blank inserted into the lock cylinder so as to cause the pins of the cylinder to protrude *generally vertically upwardly from the lock cylinder* past the outer surface *thereof, said pins being thereby gravity biased inwardly of the cylinder,* [of the lock cylinder,]

C. a carriage mounted on said frame for movement relative thereto,

D. a second key blank mounted on one of said frame and carriage,

E. a cutting disk rotatably mounted on the other of said frame and carriage,

F. means for causing rotation of said cutting disk,

G. indexing means fixed to said carriage selectively engageable with the outer surface of said lock cylinder so as to provide a reference, and selectively alignable and engageable with each of the pins protruding from said lock cylinder when said carriage is moved relative to said cylinder, H. means for causing relative movement between said [carriage] *cutting disk* and the second key blank so as to bring the second key blank and said cutting disk into immediate proximity to each other when said indexing means is in engagement with the outer surface of said lock cylinder *while maintaining the lock cylinder in a disposition in which the pins of the cylinder are generally vertically disposed,*

I. means for effecting selective alignment and engagement of said indexing means with each of the protruding pins of the lock cylinder, J. and means for causing additional relative movement between said [carriage] *cutting disk* and the second key blank when said indexing means is in alignment and engagement with one of said pins so as to cause said cutting disk to provide a cut in the second key blank equal in depth to the increment of protrusion of said pins from said lock cylinder.

[5. A method of cutting a key for a lock cylinder without reference to a sample key, which method comprises A. inserting a blank key in the lock cylinder so as to cause the pins of the cylinder to protrude past the outer surface of the lock cylinder, B. supporting a second key blank in proximity to a cutting instrument, C. and providing a cut in said second key blank for each of said pins protruding from said lock cylinder, each cut being equal in depth to the increment of protrusion of the corresponding pin from the lock cylinder.]

*6. A key cutting machine in accordance with claim 2, wherein the second key blank is mounted on said carriage and said cutter is mounted on said frame for rotation about an axis stationary relative to said frame.*

*7. A key cutting machine in accordance with claim 2, wherein said means for limiting movement of said carriage so as to limit the depth of each of the cuts in said second key blank is selectively adjustable.*

*8. A key cutting machine in accordance with claim 2, wherein mechanical means are provided for selectively and incrementally moving said indexing pin longitudinally along said lock cylinder to bring said pin into and out of alignment with any one of said lock cylinder pins and for selectively moving said cutter and second key blank relative to each other to bring said cutter into alignment with a corresponding point on said second key blank.*

*9. A key cutting machine in accordance with claim 2, wherein said means on said frame adapted to support the lock cylinder and a key blank inserted into the lock cylinder includes means for clamping the handle of the key blank and means for maintaining the key blank in the cylinder.*

*10. A key cutting machine in accordance with claim 2, wherein said lock cylinder and key blank, said cutter, said indexing pin, and said second key blank are so positioned relative to each other that when said indexing pin rests upon a given pin of said lock cylinder, said further movement of said lever will bring said cutter and said second key blank into engagement at a point on said second key blank corresponding exactly to the point on said first key blank engaged by said given pin of said lock cylinder.*

*11. A method of cutting a key for a lock cylinder without reference to a sample key, which method comprises*

*A. supporting the lock cylinder in a predetermined manner and inserting a blank key into the lock cylinder so as to cause the pins of the lock cylinder to protrude generally vertically upwardly from the lock cylinder past the outer surface thereof, the pins being thereby gravity biased inwardly of the cylinder,*

*B. supporting a second key blank in proximity to a cutting instrument so as to permit relative movement between the blank and instrument so as to bring same into and out of engagement with each other,*

*C. using the outer surface of the cylinder as a reference plane, positioning a stop for limiting the extent of penetration of the second key blank by the cutter at any given point on the second blank to the distance which the upper end surface of a given lock pin engaging a corresponding point on the first key blank protrudes past the outer surface of the lock cylinder,*

*D. and providing a cut in the second key blank for each of the pins protruding from the lock cylinder by effecting relative movement of said cutter and second key blank until penetration of said second key blank by the cutter is limited by the stop.*

References Cited

The following references, cited by the Examiner, are of record in the patented file of this patent or the original patent.

UNITED STATES PATENTS

| | | | |
|---|---|---|---|
| 1,254,442 | 1/1918 | Smith | 90—13.05 |
| 1,895,849 | 1/1933 | Haubroe | 90—13.05 |
| 2,757,578 | 8/1956 | Saucedo | 90—13.05 |
| 3,118,346 | 1/1964 | Simon | 90—13.05 |
| 23,990 | 5/1859 | Rebetey. | |
| 1,423,154 | 7/1922 | Rosak. | |
| 3,011,411 | 8/1956 | Raymond. | |
| 3,053,149 | 9/1962 | Rossetti. | |

GERALD A. DOST, Primary Examiner

U.S. Cl. X.R.

76—110

UNITED STATES PATENT OFFICE
CERTIFICATE OF CORRECTION

Patent No. Re26,848 Dated April 7, 1970

Inventor(s) Harry Simon

It is certified that error appears in the above-identified patent and that said Letters Patent are hereby corrected as shown below:

Column 2, line 57, "support" should be --supports--. Column 4, line 42, delete "plnnger" and substitute --plunger--. Column 5, line 31, delete "and the key blank 20 into the cutter 18 by" and insert --carries the upper edge of the key blank--; Column 5, line 46, delete "carries the upper edge of the key blank" and insert --and the key blank 20 into the cutter 18 by--. Column 6, line 5, before "holder" insert --a--.

SIGNED AND
SEALED
OCT 20 1970

(SEAL)
Attest:

Edward M. Fletcher, Jr.
Attesting Officer

WILLIAM E. SCHUYLER, JR.
Commissioner of Patents